United States Patent
Denzinger et al.

[11] Patent Number: 6,033,442
[45] Date of Patent: Mar. 7, 2000

[54] USE OF AQUEOUS SOLUTIONS OR DISPERSIONS OF COPOLYMERS OF CARBOXYL-GROUP-CONTAINING MONOMERS, ETHYLENICALLY UNSATURATED ACETALS, KETALS OR ORTHOCARBOXYLIC ACID ESTERS AND OPTIONALLY OTHER COPOLYMERIZABLE MONOMERS AS LEATHER TANNING AGENTS

[75] Inventors: Walter Denzinger, Speyer; Axel Kistenmacher, Ludwigshafen; Gerhard Wolf, Ketsch; Michael Kneip, Ludwigshafen; Norbert Greif, Bobenheim; Knut Oppenländer, Ludwigshafen, all of Germany

[73] Assignee: BASF Aktiengesellschaft, Ludwigshafen, Germany

[21] Appl. No.: 09/077,881

[22] PCT Filed: Dec. 2, 1996

[86] PCT No.: PCT/EP96/05318

§ 371 Date: Jun. 10, 1998

§ 102(e) Date: Jun. 10, 1998

[87] PCT Pub. No.: WO97/21839

PCT Pub. Date: Jun. 19, 1997

[30] Foreign Application Priority Data

Dec. 12, 1995 [DE] Germany ............ 195 46 254

[51] Int. Cl.[7] .............. C14C 3/22; C14C 3/28; C08F 216/38; C08F 222/00
[52] U.S. Cl. .................. 8/94.33; 8/94.21; 524/548; 524/558; 526/266
[58] Field of Search ............... 524/548, 558; 526/266; 8/94.21, 94.33

[56] References Cited

U.S. PATENT DOCUMENTS 2,205,882  6/1940  Graves .
2,205,883  6/1940  Graves .

FOREIGN PATENT DOCUMENTS 42 42 076  12/1992  Germany .

OTHER PUBLICATIONS

Synthesis and Characterization of Poly [(3, 4–Dihydro–2H–Pyran)–alt (Maleic Anhydride)] and Its Derivatives: Biologically Active Polymers, Man Jung Han, et al, Journal of Polymer Science, vol. 28, 2719–2728 (1990).

Primary Examiner—Andrew E. C. Merriam
Attorney, Agent, or Firm—Oblon, Spivak, McClelland, Maier & Neustadt, P.C.

[57] ABSTRACT

The use of aqueous solutions or dispersions of copolymers composed of

A) from 5 to 95 mol % of ethylenically unsaturated mono- or dicarboxylic acids having 3 to 10 carbons, their anhydrides, their alkali metal, alkaline earth metal or ammonium salts, or mixtures thereof, B) from 5 to 95 mol % of ethylenically unsaturated acetals, ketals or orthocarboxylic esters of the formula I

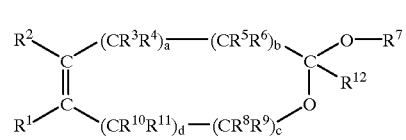

where $R^1$ to $R^{12}$ independently are hydrogen or an organic radical and a to d independently are 0 or 1, and C) from 0 to 70 mol % of other copolymerizable monomers or their hydrolysis products or polymer-analogous reaction products, as tanning agents for the self-tanning, pretanning or assist tanning of leather pelts and skin pelts or for the retanning of leather and skins.

5 Claims, No Drawings

USE OF AQUEOUS SOLUTIONS OR DISPERSIONS OF COPOLYMERS OF CARBOXYL-GROUP-CONTAINING MONOMERS, ETHYLENICALLY UNSATURATED ACETALS, KETALS OR ORTHOCARBOXYLIC ACID ESTERS AND OPTIONALLY OTHER COPOLYMERIZABLE MONOMERS AS LEATHER TANNING AGENTS

The present invention relates to the use of aqueous solutions or dispersions of copolymers composed of carboxyl-containing monomers, ethylenically unsaturated cyclic or hemicyclic acetals, ketals or orthocarboxylic esters, with or without further copolymerizable monomers, as tanning agents for leather. Since some of these copolymers are novel substances, the invention relates to them as well.

In the production of leather, the main tanning is usually carried out using mineral tanning agents, such as basic chromium, aluminum and/or zirconium salts, alone or in combination with synthetic tanning agents. Subsequent retanning using natural or synthetic tanning agents serves to improve properties of the leather such as handle, softness, grain characteristics and body.

Examples of tanning agents in retanning are syntans, ie. water-soluble condensates of, for example, naphthalenesulfonic acid and formaldehyde or of phenolsulfonic acid, formaldehyde and urea, furthermore lignosulfonic acids, and also polymers and copolymers based on acrylic acid and other unsaturated polymerizable carboxylic acids, generally in combination with the abovementioned syntans.

For example, U.S. Pat. No. 2,205,882 (1) and U.S. Pat. No. 2,205,883 (2) describe the use of polyacrylic acid, of acrylic acid-methacrylic acid copolymers, of styrene-maleic anhydride copolymers, of polymethacrylic acid, and of copolymers of methacrylic acid with styrene and/or methyl methacrylate for the tanning of leather. A disadvantage of these products is that in many cases the desired softness and body cannot be achieved. Furthermore, these products generally have a strong lightening effect on the coloring. It should also be noted that products of this kind can be employed only in a limited concentration when retanning leather, since at higher levels hardening of the leather may occur and may lead to cracking of the grain.

The known polymeric retanning agents for leather are still in need of improvement in respect of the body and softness they impart to the leather and in their coloring properties.

It is an object of the present invention, therefore to provide such retanning agents with corresponding, improved properties.

We have found that this object is achieved by the use of aqueous solutions or dispersions of copolymers composed of A) from 5 to 95 mol % of ethylenically unsaturated mono- or dicarboxylic acids having 3 to 10 carbons, their anhydrides, their alkali metal, alkaline earth metal or ammonium salts, or mixtures thereof, B) from 5 to 95 mol % of ethylenically unsaturated acetals, ketals or orthocarboxylic esters of the formula I

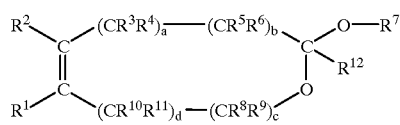

where
$R^1$ and $R^2$ independently are hydrogen, $C_1$–$C_{10}$-alkyl, $C_1$–$C_{10}$-alkoxy, amino, $C_1$–$C_4$-alkylamino or di-$C_1$–$C_4$-alkylamino, $R^3, R^4, R^5, R^6, R^8, R^9, R^{10}$ and $R^{11}$ independently are hydrogen, $C_1$–$C_{10}$-alkoxy, amino, $C_1$–$C_4$-alkylamino, di-$C_1$–$C_4$-alkylamino, $C_6$–$C_{14}$-aryl, $C_7$–$C_{18}$-aralkyl, carboxyl, $C_1$–$C_{20}$-alkoxycarbonyl, $C_2$–$C_{18}$-alkyl interrupted by 1–5 nonadjacent oxygens, or are sulfo or phosphono, $R^7$ is hydrogen, $C_1$–$C_{10}$-alkyl, $C_6$–$C_{14}$-aryl, $C_7$–$C_{18}$-aralkyl or $C_1$–$C_{10}$-acyl, $R^{12}$ is hydrogen, $C_1$–$C_{10}$-alkyl, $C_1$–$C_{10}$-alkoxy, hydroxyl or $C_1$–$C_{10}$-acyloxy and a,b,c and d independently are 0 or 1, it also being possible for $R^2$ and $R^4$ together to form 1,3- or 1,4-alkylene of 3 to 12 carbons and for $R^5$ and $R^7$ together to form 1,2- or 1,3-alkylene of 2 to 12 carbons, and C) from 0 to 70 mol % of other copolymerizable monomers, or their hydrolysis products or polymer-analogous reaction products, as tanning agents for the self-tanning, pretanning and assist tanning of leather pelts and skin pelts and for the retanning of leather and skins.

Particularly suitable carboxyl-containing monomers from group A are monoethylenically unsaturated mono- or dicarboxylic acids or their corresponding anhydrides of 3 to 6 carbons, for example acrylic, methacrylic, ethylacrylic, allylacetic, crotonic, vinylacetic, maleic, itaconic, mesaconic, fumaric, citraconic, and methylenemalonic acids, monoalkyl maleate, and the alkali, alkaline earth metal and ammonium salts of these acids, or mixtures thereof. In the case of monoalkyl esters of dicarboxylic acids, the given number of carbons relates to the dicarboxylic acid structure, while the alkyl ester group can independently have from 1 to 20, especially 1 to 8, carbons. Suitable, corresponding, monoethylenically unsaturated dicarboxylic anhydrides are maleic anhydride, itaconic anhydride, citraconic anhydride or mixtures thereof. Preference is given to acrylic, methacrylic, maleic and itaconic acid and to maleic anhydride. Group B monomers are monoethylenically unsaturated acetals, ketals or orthocarboxylic esters with a cyclic or semicyclic structure.

$R^1$ and $R^2$ independently are preferably hydrogen, $C_1$–$C_4$-alkyl, especially methyl and ethyl, $C_1$–$C_4$-alkoxy, especially methoxy and ethoxy, N—($C_1$–$C_4$-alkyl)amino, especially N-methylamino and N-ethylamino, and N,N-(di-$C_1$–$C_4$-alkyl)amino, especially N,N-dimethylamino and N,N-diethylamino.

$R^3, R^4, R^5, R^6, R^8, R^9, R^{10}$ and $R^{11}$ independently are preferably hydrogen, $C_1$–$C_4$-alkyl, especially methyl and ethyl, $C_1$–$C_4$-alkoxy, especially methoxy and ethoxy, N—($C_1$–$C_4$-alkyl)amino, especially N-methylamino and N-ethylamino, N,N-(di-$C_1$–$C_4$-alkyl)amino, especially N,N-dimethylamino and N,N-diethylamino, phenyl, tolyl, benzyl, carboxyl, $C_1$–$C_4$-alkoxycarbonyl, especially methoxycarbonyl and ethoxycarbonyl, and groups of the formula —CH$_2$OCH$_3$, —CH$_2$OCH$_2$CH$_3$, —CH$_2$CH$_2$OCH$_3$, CH$_2$CH$_2$OCH$_2$CH$_3$, —CH$_2$O(C$_2$H$_4$O)$_m$CH$_3$, —CH$_2$O(C$_3$H$_6$O)$_n$CH$_3$ and —CH$_2$O(C$_4$H$_8$O)$_p$CH$_3$ (where m, n and p=2 to 4).

R$^7$ is preferably hydrogen, C$_1$–C$_4$-alkyl such as methyl, ethyl, n-propyl, isopropyl, n-butyl, isobutyl, sec-butyl and tert-butyl, phenyl, tolyl, C$_7$–C$_{12}$-aralkyl such as benzyl and 2-phenylethyl, and C$_1$–C$_4$-acyl such as formyl, acetyl, propionyl and butyryl.

R$^{12}$ is preferably hydrogen, C$_1$–C$_4$-alkyl, such as methyl, ethyl, n-propyl, isopropyl, n-butyl, isobutyl, sec-butyl and tert-butyl, C$_1$–C$_4$-alkoxy such as methoxy, ethoxy, n-propoxy, isopropoxy, n-butoxy, isobutoxy, sec-butoxy and tert-butoxy, hydroxyl and C$_1$–C$_4$-acyloxy, such as acetoxy, propionyloxy and butyryloxy. R$^{12}$ is particularly preferably hydrogen.

1,3- or 1,4-alkylene formed jointly by R$^2$ and R$^4$ is, in particular, —CH$_2$CH$_2$CH$_2$—, —CH(CH$_3$)CH$_2$CH$_2$—, —CH(CH$_3$)CH$_2$CH(CH$_3$)—, —CH$_2$CH(CH$_3$)CH$_2$—, —CH(C$_4$H$_9$)CH$_2$CH$_2$—, —CH$_2$CH$_2$CH$_2$CH$_2$—, —CH(CH$_3$)CH$_2$CH$_2$CH$_2$— and —CH(C$_4$H$_9$)CH$_2$CH$_2$CH$_2$—.

1,2- or 1,3-alkylene formed jointly by R$^5$ and R$^7$ is, in particular, —CH$_2$CH$_2$—, —CH(CH$_3$)CH$_2$—, —CH(CH$_3$)CH(CH$_3$)—, —CH(C$_2$H$_5$)CH$_2$—, —CH(C$_4$H$_9$)CH$_2$—, —CH$_2$CH$_2$CH$_2$—, —CH(CH$_3$)CH$_2$CH$_2$—, —CH(CH$_3$)CH$_2$CH(CH$_3$)—, —CH$_2$CH(CH$_3$)CH$_2$— and —CH(C$_4$H$_9$)CH$_2$CH$_2$—.

In a preferred embodiment, the monomers B copolymerized are 5,6-dihydro-4H-pyrans of the formula Ia

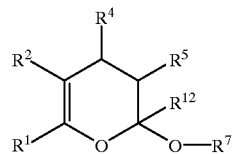

Ia (R$^3$ and R$^6$=hydrogen, a and b=1, c and d=0) or 2,5-dihydrofurans of the formula Ib

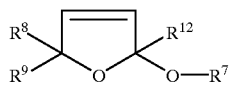

Ib (R$^1$ and R$^2$=hydrogen, a, b and d=0, c 1) the variables in formulae Ia and Ib being as defined above.

Specific examples of monomers B are:

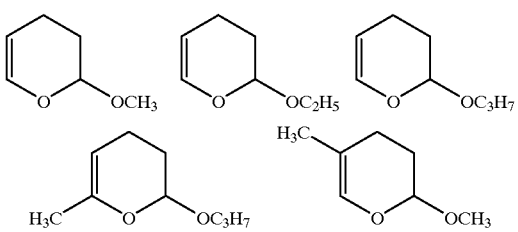

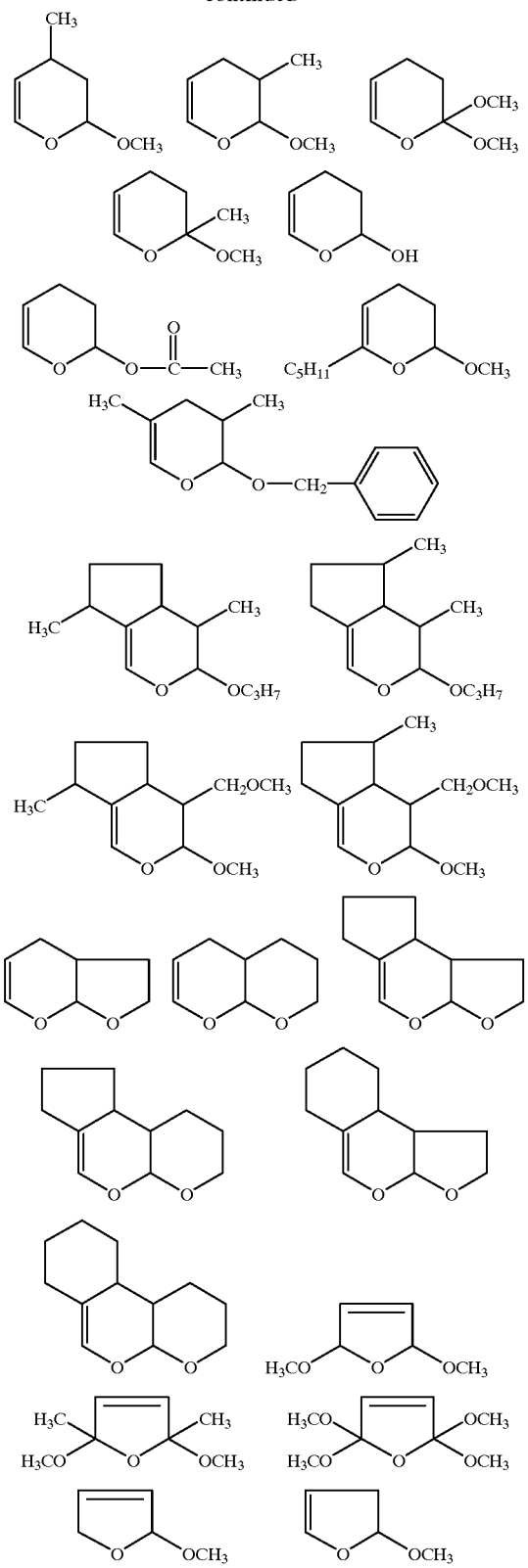

Especially preferred monomers B are:

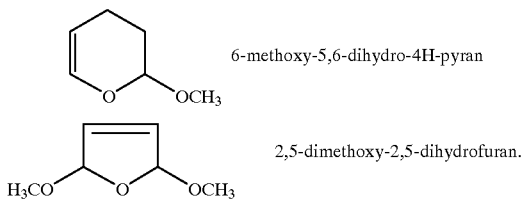

6-methoxy-5,6-dihydro-4H-pyran 2,5-dimethoxy-2,5-dihydrofuran.

Examples of the preferably carboxyl-free group C monomers include:

$C_1$–$C_{30}$ esters of acrylic or methacrylic acid, for example methyl, ethyl, propyl, isopropyl, butyl, hexyl, 2-ethylhexyl, lauryl and octadecyl (meth)acrylate and phenoxyethyl acrylate;

hydroxyalkyl esters of acrylic or methacrylic acid, for example hydroxyethyl and hydroxypropyl (meth) acrylate and 1,4-butanediol monoacrylate;

alkyloxyalkyl esters of monoethylenically unsaturated $C_3$–$C_{10}$-mono- or -dicarboxylic acids, for example methyldiglycol acrylate and methylpentaglycol methacrylate;

diesters of maleic acid, for example dimethyl and dibutyl maleate;

linear and branched-chain α-olefins or mixtures thereof, such as ethene, propene, butene, isobutene, pentene, cyclopentene, hexene, cyclohexene, octene and 2,4,4-trimethyl-1-pentene as a mixtures, if desired, with 2,4,4-trimethyl-2-pentene, 1-octene, $C_8$-$C_{10}$ olefin, 1-dodecene, $C_{12}$–$C_{14}$ olefin, $C_{20}$–$C_{24}$ olefin; oligoolefins prepared under metallocene catalysts, such as oligopropene, oligohexene and oligooctadecene; and olefins prepared by cationic polymerization and having a high α-olefin content, for example reactive polyisobutene;

acrylamides and alkyl-substituted acrylamides, for example acrylamide, methacrylamide and N-tert-butylacrylamide;

vinyl and allyl alkyl ethers of 1 to 40 carbons in the alkyl radical, which radical can also carry further substituents such as hydroxyl, amino or dialkylamino or one or more alkoxylate groups, examples being: methyl, ethyl, propyl, isobutyl, 2-ethylhexyl, decyl, dodecyl, octadecyl, 2-(diethylamino)ethyl, 2-(di-n-butyl-amino) ethyl and methyldiglycol vinyl ethers and the corresponding allyl ethers;

sulfo-containing monomers, for example allylsulfonic and methallylsulfonic acid, styrene sulfonate, vinylsulfonic acid, allyloxybenzenesulfonic acid and 2-acrylamido-2-methylpropanesulfonic acid;

acrylamides or (meth)acrylates, containing tertiary amino, such as 2-(N,N-dimethylamino)ethyl (meth)acrylate, 2-(N,N-diethylamino)ethyl (meth)acrylate, 2-dimethylaminoethyl(meth)acrylamide and 3-dimethylaminopropyl(meth)acrylamide, and their salts with mineral acids or their quaternization products with alkyl halides or alkyl sulfates;

vinyl esters of $C_1$–$C_{20}$-carboxylic acids, for example vinyl formate, acetate, propionate, butyrate, stearate and laurate;

N-vinylcarboxamides of $C_1$–$C_8$ carboxylic acids, for example N-vinylformamide, N-vinyl-N-methylformamide and N-vinylacetamide;

other comonomers, for example styrene, α-methylstyrene, butadiene, N-vinylpyrrolidone, N-vinylimidazole, acrolein, methacrolein, acrylonitrile, 4-vinylpyridine, indene and diallyldimethylammonium chloride.

Preferred group C comonomers are methyl (meth) acrylate, ethyl (meth)acrylate, lauryl (meth)acrylate, butene, isobutene, 2,4,4-trimethyl-1-pentene, 1-octene, $C_8$–$C_{10}$ olefin, 1-dodecene, $C_{12}$–$C_{14}$ olefin, $C_{20}$–$C_{24}$ olefin, oligopropene, oligohexene, oligooctadecene, reactive polyisobutene, vinyl stearate, 2-acrylamido-2-methylpropanesulfonic acid, ethylhexyl vinyl ether, styrene, acrolein and acrylonitrile.

The group A and C monomers are very common polymer structural units and are readily available.

The group B monomers of formula I can be prepared by various methods, examples being: preparation from halogen/Oalkyl acetals with alcohols, preparation from aldehydes or ketones with hydroxy compounds, preparation from enol ethers with alcohols, preparation from enones and enol ethers by [4+2] cycloaddition or from ethers by electrolysis. These and other methods are compiled in general form, for example, in Houben-Weyl, Methoden der Organischen Chemie, Vol. E14a/1, Ed. H. Hagemann, Thieme-Verlag 1991.

In J. Pol. Sci., Part A, Polymer Chemistry, Vol. 28, (1990) 2719–2728 (3) M. J. Han et al. describe copolymers of maleic anhydride with 5,6-dihydro-4H-pyran and various of its derivatives, for example 6-methoxy-5,6-dihydro-4H-pyran, 6-ethoxy-5,6-dihydro-4H-pyran, 6-acetoxy-5,6-dihydro-4H-pyran and 6-hydroxy-5,6-dihydro-4H-pyran. Copolymerization is performed at 70° C. in acetone using 2,2'-azobis(isobutyronitrile) as initiator. The polymers are obtained in yields of 20 and 72%. The copolymers were tested for their effectiveness against tumor cells.

The novel copolymers described are composed preferably of from 10 to 90 mol % of monomers A and from 10 to 90 mol % of monomers B. If monomers C are included, then their proportion is preferably from 10 to 70 mol %.

The polymerization can be carried out in the presence of inert solvents or inert diluents or else in their absence, as a bulk polymerization. The use of solvents or diluents has the advantages of ensuring both good dissipation of the heat of polymerization and a low viscosity. Solvents which can be employed are those capable of dissolving both the monomers and the polymer which is formed. This is called solution polymerization. The method or precipitation polymerization can also be employed to advantage, where the monomers are at least partially soluble in the solvent but the polymer which forms is not. Consequently, the product is precipitated as the polymerization progresses. This ensures a low viscosity during polymerization and makes it easy to isolate the solid product if desired. Other polymerization techniques which can be used to advantage to prepare the copolymers described are emulsion and suspension polymerization. In these cases the monomers are distributed in dispersed form in a continuous phase—usually water, although hydrocarbons or other solvents can also be used. The advantages of such methods are that polymerization can be carried out at low viscosity and that the products, especially when water is used as continuous phase, can in most cases be employed directly for their intended application.

In the case of precipitation, suspension or emulsion polymerization it may be advantageous to use emulsifiers or protective colloids in order to stabilize the droplets or particles. Examples of emulsifiers are: alkylphenol ethoxylates, primary alcohol ethoxylates, linear alkylbenzenesulfonates, alkyl sulfates, ethylene oxide/propylene oxide block copolymers or alkyl polyglucosides.

Examples of protective colloids are cellose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and copolymers containing maleic acid and/or maleic anhydride. The emulsifiers or protective colloids are usually used in concentrations of from 0.05 to 15% by weight, based on the monomers.

The polymers described are preferably prepared by the method of precipitation or solution polymerization. Examples of suitable solvents and diluents are toluene, o-xylene, p-xylene, ethylbenzene, industrial mixtures of alkyl aromatic compounds, cyclohexane, industrial mixtures of aliphatic compounds, acetone, cyclohexanone, tetrahydrofuran, dioxane, glycols and glycol derivatives, polyalkylene glycols and their derivatives, diethyl ether, tert-butyl methyl ether, methyl acetate, ethanol, isopropanol and water and mixtures of different solvents, for example water/isopropanol or isopropanol/diethylene glycol. If water is used there is a risk of some of the ethylenically unsaturated acetal employed hydrolyzing before it can be incorporated by polymerization. This can be prevented by carrying out polymerization in a pH range which does not permit hydrolysis to occur. This range is situated above a pH of 3. If carboxyl- or sulfo-containing monomers are used in aqueous solution, they are preferably in partly neutralized form in order to safeguard the correct pH range. Furthermore, a buffer system can also be used.

Polymerization can be carried out continuously or batchwise, at from 20° C. to 250° C., preferably 50° C. to 160° C. Polymerization is preferably carried out by metering at least part of the monomers and of the initiator into the reaction vessel during polymerization and making the feed time as long as is desired so as to release the heat given off in polymerization over a defined period. The inflow of monomers into the reactor per unit time can be kept constant; however, it is also possible to alter the flow of monomers and/or initiator during the polymerization in order, for example to obtain a certain molecular weight distribution or to bring about altered copolymer compositions.

The copolymers described are generally prepared using initiators which form free radicals. Suitable such free-radical initiators are preferably all those compounds which at the particular polymerization temperature chosen have a half life of from 1 minute to 10 hours. If polymerization is begun at a lower temperature and completed at a higher temperature, it is advantageous to operate with at least two initiators decomposing at different temperatures, ie. an initiator which decomposes at the lower temperature, to initiate polymerization, and then an initiator which decomposes at the higher temperature, in order to complete the main polymerization. The initiator used is generally soluble in the respective solvent or diluent. In the case of polymerization in disperse phase, it is also possible to employ initiators soluble only in one phase.

It is common to employ peroxides or azo compounds as polymerization initiators, eg. acetyl cyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), 2,2'-azobis(2-methyl-N-phenylpropionamidine)dihydrochloride, tert-butyl perpivalate, dioctanoyl peroxide, dilauroyl peroxide, 2,2'-azobis(2,4-dimethylvaleronitrile), dibenzoyl peroxide, tert-butyl per-2-ethylhexanoate, tert-butyl permaleate, 2,2'-azobis(isobutyronitrile), dimethyl 2,2'-azobisisobutyrate, sodium persulfate, potassium persulfate, ammonium persulfate, bis(tert-butyl peroxy)cyclohexane, tert-butyl peroxyisopropylcarbonate, tert-butyl peracetate, hydrogen peroxide, 2,2-bis(tert-butylperoxy)butane, dicumyl peroxide, di-tert-amyl peroxide, di-tert-butyl peroxide, pinane hydroperoxide or tert-butyl hydroperoxide.

The half lives of the abovementioned free-radical initiators can be reduced by additionally using salts or complexes of heavy metals, for example salts of copper, cobalt, manganese, iron, vanadium, cerium, nickel or chromium, or organic compounds such as benzoin, dimethylaniline or ascorbic acid. For example, tert-butyl hydroperoxide can be activated by the addition of 5 ppm of copper(II) acetylacetonate such that polymerization can be carried out at as low as 100° C. The reducing component of redox catalysts can also be formed, for example, by compounds such as sodium sulfite, sodium bisulfite, sodium formaldehyde-sulfoxylate and hydrazine.

Based on the monomers employed in polymerization, from 0.01 to 20% by weight, preferably from 0.05 to 15% by weight, of a polymerization initiator or mixture of two or more such initiators is used. As redox components, from 0.01 to 30% by weight of the reducing compounds is added. Heavy metals are employed in a proportion ranging from 0.1 to 100 ppm, preferably from 0.5 to 10 ppm. It is often advantageous to use a combination of peroxide, reducing agent and heavy metal as redox catalyst.

To prepare polymers of low average molecular weight, polymerization is advantageously carried out in the presence of regulators, examples of suitable such regulators being mercapto compounds, such as mercaptoethanol, mercaptopropanol, mercaptobutanol, mercaptoacetic acid, mercaptopropionic acid, butylmercaptan, n-dodecylmercaptan or tert-dodecylmercaptan. Other suitable regulators are allyl alcohol, propionaldehyde, n-butyraldehyde and isobutyraldehyde, formic acid, ammonium formate, propionic acid, hydrazine sulfate, hydroxylammonium sulfate and butenols. If used, the required amount of regulator is from 0.05 to 20% by weight, based on the monomers used in polymerization. The copolymers have a number-average molecular weight of from 500 to 1,000,000, preferably from 800 to 150,000.

If polymerization is carried out in bulk, then in order to obtain a useful product the polymer must be converted to an aqueous solution or dispersion. This can be done, for example, by adding water to the polymer after the end of the polymerization and dissolving or dispersing the mixture at an appropriate temperature. If desired, the polymer can also be introduced as a melt or solid, with stirring, into a stirred vessel filled with water.

Any organic solvent or precipitating agent used during the polymerization must be substantially removed and replaced by water in order to obtain a useful product. In the case of a precipitation polymerization, an option is to isolate the polymer by drying, filtration or distillative removal of the solvent and then to treat it with water. It is often advantageous to use a steam-volatile solvent for the polymerization, which provides the option of removing the solvent by steam distillation. The technique of steam distillation can also be used advantageously following solution polymerization in a steam-volatile solvent, in which case the use of an antifoam or foam suppressant may be advantageous.

The cyclic and semicyclic acetals copolymerized as monomers B can be hydrolyzed, in a polymer-analogous reaction, to the corresponding aldehydes. Furthermore, the copolymerized ketals or orthocarboxylic esters can be converted into the corresponding ketones or, respectively, carboxylic acids. The presence of free or hydrated aldehyde, ketone or carboxyl groups in the polymers may increase both the water-solubility of the products and their efficiency. To promote the formation of aldehyde, ketone or orthocarboxylic acid groups, the aqueous polymer solution or dispersion is heated for a relatively long period. Substantial hydrolysis of the acetal groups takes place, in particular, in the course of steam distillation in an acid medium. To accelerate the process of hydrolysis, it is also possible to employ a catalyst, for example p-toluenesulfonic acid, as well. In principle, under these conditions of hydrolysis, carboxylic anhydride structures of the monomers A may also be converted into carboxyl.

The aldehyde group-containing polymers obtained after opening the acetals may be subjected to further polymer-analogous reaction. For example, they can be reacted with alcohols to give hemiacetals or acetals, with mercaptans to give thioacetals, with ammonia or primary amines to give Schiff bases, with hydroxylamines to give oximes, with hydrazines to give hydrazones, with secondary amines to give enamines and with sodium bisulfite to give bisulfite addition compounds. The aldehyde groups can also be reduced to alcohols or amines. Similarly, ketone or carboxyl groups obtainable by hydrolysis can be subjected to polymer-analogous reactions in accordance with techniques known per se.

If the group A comonomer used comprises a monoethylenically unsaturated dicarboxylic anhydride, such as maleic anhydride, then the anhydride group can be reacted in a polymer-analogous way provided the polymerization was not carried out in a nonaqueous medium where, consequently, the anhydride group was not hydrolyzed. To bring about partial esterification of the anhydride groups present in the copolymer, they are reacted with alcohols, using quantities of alcohols such that 10 to 70% of the total carboxyls resulting from the copolymerized dicarboxylic anhydride fractions are esterified. This esterification takes place preferably with the exclusion of water. Suitable alcohols may contain 1 to 40, preferably 3 to 30, carbons, and may be primary, secondary or tertiary.

In this context it is possible to use both saturated aliphatic alcohols and unsaturated alcohols, for example oleyl alcohol. It is preferred to use monohydric, primary or secondary alcohols, eg. methanol, ethanol, n-propanol, isopropanol, n-butanol, isobutanol, n-pentanol and isomers, n-hexanol and isomers, n-octanol and isomers, such as 2-ethylhexanol; nonanols, decanols, dodecanols, tridecanols, cyclohexanol, tallow fatty alcohol, stearyl alcohol, alkoxylated $C_1$–$C_{30}$-alcohols, for example methyldiglycol and methylpentaglycol, or polyalkylene glycols, for example polyethylene glycol, polypropylene glycol and polytetrahydrofuran, and also the alcohols or alcohol mixtures of 9 to 19 carbons which are readily obtainable industrially by oxo synthesis, for example $C_{9/11}$ oxo alcohol, $C_{13/15}$ oxo alcohol, and also Ziegler alcohols of 12 to 24 carbons. Preference is given to the use of $C_3$–$C_{30}$ alcohols such as n-butanol, isobutanol, amyl alcohol, 2-ethylhexanol, tridecanol, tallow fatty alcohol, stearyl alcohol, $C_{9/11}$ oxo alcohol, $C_{13/15}$ oxo alcohol, $C_{12/14}$ Alfols® and $C_{16/18}$ Alfols. Esterification can if desired be accelerated by the use of a catalyst such as p-toluenesulfonic acid, for example.

The copolymers containing anhydride groups can also be amidated or imidized by addition of primary or secondary amines, respectively. Amidation/imidization is carried out using quantities of amines such that from 10 to 70% of the total carboxyls formed from the copolymerized dicarboxylic anhydride fractions are amidated or from 10 to 70% of the copolymerized dicarboxylic anhydride units are imidized.

To form amides ammonia and primary and secondary amines can be used. Amide formation takes place preferably in the absence of water by reaction of the anhydride groups of the copolymer with ammonia or with the amines. The primary and secondary amines which are relevant may contain 1 to 40, preferably 3 to 30, carbons. Suitable examples are methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine, oleylamine, dimethylamine, diethylamine, di-n-propylamine, diisopropylamine, di-n-butylamine, diisobutylamine, dihexylamine, dicyclohexylamine, dimethylcyclohexylamine, di-2-ethylhexylamine, di-n-octylamine, diisotridecylamine, di-tallow fatty amine, distearylamine, dioleylamine, ethanolamine, diethanolamine, n-propanolamine, di-n-propanolamine, sarcosine, taurine and morpholine. By selecting appropriate reaction conditions, ammonia or primary amines can be used to produce imide structures from the dicarboxylic anhydride units of the copolymer.

Following partial conversion of the anhydride groups to monoester, monoamide or imide groups and, if desired, subsequent hydrolytic opening of the acetal, ketal or orthoester groups, the remaining anhydride groups of the polymer can be hydrolyzed. This can also be carried out simultaneously with the partial neutralization which is still necessary, by adding an aqueous base to the partially esterified, amidated or imidized copolymer which still contains anhydride groups. To accelerate hydrolysis of the anhydride groups it is also possible if desired to add an appropriate catalyst, such as 4-dimethylaminopyridine.

The carboxyl-containing copolymers are generally converted to a neutralized form. Preferably, 10–95% of the carboxyls are neutralized. Examples of suitable neutralizing bases are alkali metal or alkaline earth metal hydroxides, for example sodium hydroxide, potassium hydroxide or magnesium hydroxide, alkali metal or alkaline earth metal carbonates, for example sodium carbonate or potassium carbonate, ammonia, methylamine, dimethylamine, trimethylamine, ethylamine, diethylamine, triethylamine, ethanolamine, diethanolamine, dimethylethanolamine, triethanolamine or morpholine. Neutralization can take place either during actual polymerization, for example by employing partially neutralized monomers, or following polymerization and, if desired, after the hydrolytic opening of the acetal, ketal or orthocarboxylic ester structures.

The copolymer solutions or dispersions obtainable in this way are highly suitable as tanning agents in the production of leather and furs. For instance, the copolymers used in accordance with the invention can be used for the self-tanning and pretanning of leather pelts and skin pelts in aqueous liquor. In this case an advantageous procedure is to treat the pickled leather pelts, for example cattle pelts having a split thickness of from 1.5 to 4 mm, or skin pelts, for example sheepskin pelts, with an aqueous solution or dispersion of the copolymers used in accordance with the invention at a pH from 2 to 7, in particular from 2.5 to 4.5, and at from 15 to 40° C., in particular from 20 to 35° C., for a period of from 2 to 20 hours. This treatment takes the form, for example, of milling in a drum. The required quantity of copolymers used in accordance with the invention is normally, based on the weight of pelt, from 2 to 30% by weight, in particular from 5 to 25% by weight. The liquor length, ie. the percentage ratio of treatment liquor to goods, is customarily from 30 to 200% in the case of leather pelts and from 100 to 2000% in the case of skin pelts, based in each case on the pelt weight.

On completion of the treatment the leather or skin is customarily brought to a pH of from 2 to 8, in particular from 3 to 5, using for example magnesium oxide, sodium carbonate, sodium bicarbonate or an organic acid, such as formic acid, or a salt thereof, is treated if desired with further tanning agents, and, toward the end or on completion of the tanning process, is optionally dyed and fatliquored.

The copolymers used in accordance with the invention can additionally be used for assist tanning of leather pelts and skin pelts together with the tanning agents of the main tannage, which may for example be a chrome, aluminum, titanium or zirconium tannage. In this case the working conditions concerning pH, temperature and duration of treatment are adjusted to the requirements of the main components of the tanning; the same applies to the treatment apparatus, the liquor length and the aftertreatment. In this case the requisite quantity of copolymer used in accordance with the invention is normally, based on the leather pelt weight, from 0.1 to 20% by weight, in particular from 0.5 to 14% by weight.

The copolymers used in accordance with the invention can also be employed for retanning previously tanned leather and skin, for example chrome tanned leather (wet blue), wet white (ie. leather pelts or skin pelts pretanned with, for example, aldehydes or syntans) or vegetable-tanned leather or skin, working in an aqueous liquor. Preferably, chrome-tanned leather is retanned. This is generally carried out by tanning the pickled leather pelts and skins, for example cattle pelts having split thicknesses of from 1.5 to 4 mm, with, for example, a customary chromium-containing tanning agent such as a chromium(III) salt, eg. chromium(III) sulfate, in a conventional manner, deacidifying the resulting pretanned hides, and treating the deacidified hides at a pH of from 2 to 7, in particular from 2.5 to 6, and at from 15 to 60° C., in particular from 25 to 45° C., with an aqueous solution or dispersion of the copolymers used in accordance with the invention, for a period of from 0.25 to 12 hours. This treatment takes the form, for example, of milling in a drum. The required quantity of copolymer used in accordance with the invention is normally, based on the shaved weight of the leather, from 2 to 30% by weight, in particular from 5 to 25% by weight. The liquor length is normally from 30 to 200% in the case of leather pelts and from 100 to 2000% in the case of skin pelts, based in each case on the shaved weight of the leather.

After the treatment, and if necessary beforehand as well, the leather or skin is customarily adjusted to a pH of from 3 to 5, for example using magnesium oxide or an organic acid, such as formic acid, or salts thereof, and toward the end of or after the treatment it is, if desired, dyed and fatliquored.

The leather or skin which has been retanned in this way may have been additionally treated, prior to retanning with the copolymers used in accordance with the invention, with other tanning agents, such as polymer tanning agents, syntans or vegetable tanning agents. Moreover, the copolymers used in accordance with the invention may be employed at the same time as such additional tanning agents.

Suitable tanning agents used in addition or simultaneously are all customary agents having a tanning action on leather pelts and skin pelts. A comprehensive treatment of such tanning agents may be found, for example, in Ullmanns Enzyklopädie der technischen Chemie, 3rd Edition, Volume 11, (1960) pp.585–612. Specific classes of tanning agent which may be mentioned are the mineral tanning agents, for example chromium, aluminum, titanium and zirconium salts, the synthetic tanning agents (syntans), vegetable (plant-derived) tanning agents, and polymer tanning agents.

The leather produced with the copolymers used in accordance with the invention shows outstanding results in respect of light fastness and thermal stability. This is observed in particular on chrome-pretanned leather. Moreover, even at low rates of application, the copolymers used in accordance with the invention provide very good body, great softness and good firm grain. At high rates, there is no hardening of the leather.

Surprisingly, the disadvantageous dyeing behavior of polymers based on acrylic and methacrylic acid is no longer found with the copolymers used in accordance with the invention. The latter products, for instance, give rise to leather having a very dark coloration and enhanced through-coloring, and at the same time very uniform and level dyeings are achieved.

A particular advantage of the copolymers used in accordance with the invention is that, unlike conventional syntans, they contain no health-endangering unsulfonated phenols as residual monomers, and, in comparison to conventional polymer tanning agents, the increased reactivity of the latent aldehyde functions present in the copolymer means that better exhaustion of the tanning liquors is achieved, with the result that a lesser degree of pollution of the wastewaters with organic substances is observed.

Since some of the copolymers described are novel, the present invention additionally provides copolymers composed of A) from 5 to 95 mol % of ethylenically unsaturated mono- or dicarboxylic acids having 3 to 10 carbons, their anhydrides, their alkali metal, alkaline earth metal or ammonium salts, or mixtures thereof, B) from 5 to 95 mol % of ethylenically unsaturated acetals, ketals or orthocarboxylic esters of the formula I

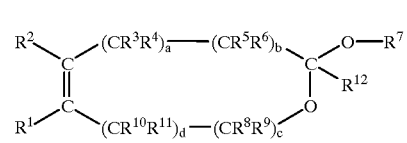

where $R^1$ and $R^2$ independently are hydrogen, $C_1$–$C_{10}$-alkyl, $C_1$–$C_{10}$-alkoxy, amino, $C_1$–$C_4$-alkylamino, or di-$C_1$–$C_4$-alkylamino, $R^3, R^4, R^5, R^6, R^8, R^9, R^{10}$ and $R^{11}$ independently are hydrogen, $C_1$–$C_{10}$-alkoxy, amino, $C_1$–$C_4$-alkylamino, di-$C_1$–$C_4$-alkylamino, $C_6$–$C_{14}$-aryl, $C_7$–$C_{18}$-aralkyl, carboxyl, $C_1$–$C_{20}$-alkoxycarbonyl, $C_2$–$C_{18}$-alkyl interrupted by 1–5 nonadjacent oxygens, or are sulfo or phosphono, $R^7$ is hydrogen, $C_1$–$C_{10}$-alkyl, $C_6$–$C_{14}$-aryl, $C_7$–$C_{18}$-aralkyl or $C_1$–$C_{10}$-acyl, $R^{12}$ is hydrogen, $C_1$–$C_{10}$-alkyl, $C_1$–$C_{10}$-alkoxy, hydroxyl or $C_1$–$C_{10}$-acyloxy and a,b,c and d independently are 0 or 1, it also being possible for $R^2$ and $R^4$ together to form 1,3- or 1,4-alkylene of 3 to 12 carbons and for $R^5$ and $R^7$ together to form 1,2- or 1,3-alkylene of 2 to 12 carbons, and C) from 0 to 70 mol % of other copolymerizable monomers, with the exception of those whose copolymerized monomer A comprises maleic anhydride and whose copolymerized monomer B comprises 6-acetoxy-5,6-dihydro-4H-pyran, 6-methoxy-5,6-dihydro-4H-pyran, 6-ethoxy-5,6-dihydro-4H-pyran or 6-hydroxy-5,6-dihydro-4H-pyran, and hydrolysis products and polymer-analogous reaction products of these copolymers.

The disclaimed copolymers of maleic anhydride and the four abovementioned monomers B are already known from (3), where, however, they are recommended for an entirely different use.

EXAMPLES

Unless otherwise stated, percentages are by weight.

The K values of the copolymers were determined by the method of H. Fikentscher, Cellulose-Chemie, Volume 13, (1932) 58–64 and 71–74 in an aqueous solution of the sodium salts of the copolymers at a concentration of 1% by weight, at a pH of 7 and at 25° C.

The solids contents were determined by drying for 2 hours at 80° C. under reduced pressure.

Preparation of the copolymers

Example 1

A stirred 4 l glass reactor fitted with anchor stirrer, 2 automatic feed metering devices, reflux condenser and oil-bath heating was charged with 147.0 g of maleic anhydride and 1178 g of toluene, and these components were heated to 110° C. under inert gas. Feed stream 1, consisting of 171.0 g of 6-methoxy-5,6-dihydro-4H-pyran, was metered at a uniform rate over 3 hours into the resulting solution. Beginning at the same time as feed stream 1, feed stream 2, consisting of 22.6 g of tert-butyl per-2-ethylhexanoate and 94 g of toluene, was metered in at a uniform rate over the course of 4 hours. Subsequently, the reaction mixture was post-polymerized at 110° C. for 2 hours more. After the end of polymerization, a pale brown suspension of low viscosity was obtained. 200 g of deionized water were added to the reaction mixture, and the organic solvent was distilled off azeotropically by passing in steam. At the end of steam distillation a brown solution was present, which was cooled and neutralized with 154.0 g of 50% sodium hydroxide solution. This gave a dark brown, clear solution with a pH of 7.2 and a solids content of 33.4%. The K value of a 1% strength aqueous solution of the copolymer (pH 7) was 15.0.

Example 2

A stirred 4 l glass reactor fitted with anchor stirrer, 2 automatic feed metering devices, reflux condenser and oil-bath heating was charged with 147.0 g of maleic anhydride and 1178 g of toluene, and these components were heated to 110° C. under inert gas. Feed stream 1, consisting of 171.0 g of 6-methoxy-5,6-dihydro-4H-pyran, was metered at a uniform rate over 3 hours into the resulting solution. Beginning at the same time as feed stream 1, feed stream 2, consisting of 22.6 g of tert-butyl per-2-ethylhexanoate and 94 g of toluene, was metered in at a uniform rate over the course of 4 hours. Subsequently, the reaction mixture was post-polymerized at 110° C. for 2 hours more. After the end of polymerization, a pale brown suspension of low viscosity was obtained. 200 g of deionized water were added to the reaction mixture, and the organic solvent was distilled off azeotropically by passing in steam. At the end of steam distillation a brown solution was present, which was treated with 0.32 g of p-toluenesulfonic acid, stirred at 100° C. for an hour, then cooled and neutralized with 154.0 g of 50% sodium hydroxide solution. This gave a black-brown, clear solution with a pH of 7.2 and a solids content of 33.6%. The K value of a 1% strength aqueous solution of the copolymer (pH 7) was 15.0.

Example 3

A stirred 4 l glass reactor fitted with anchor stirrer, 2 automatic feed metering devices, reflux condenser and oil-bath heating was charged with 147.0 g of maleic anhydride and 1178 g of o-xylene, and these components were heated to 145° C. under inert gas. Feed stream 1, consisting of 171.0 g of 6-methoxy-5,6-dihydro-4H-pyran, was metered at a uniform rate over 3 hours into the resulting solution. Beginning at the same time as feed stream 1, feed stream 2, consisting of 22.3 g of tert-butyl per-2-ethylhexanoate and 94 g of o-xylene, was metered in at a uniform rate over the course of 4 hours. Subsequently, the reaction mixture was post-polymerized at 145° C. for 2 hours more. After the end of polymerization, a brown suspension of low viscosity was obtained. 200 g of deionized water were added to the reaction mixture, and the solvent, o-xylene, was distilled off azeotropically by passing in steam. At the end of steam distillation a brown solution was present, which was cooled and neutralized with 120.0 g of 50% sodium hydroxide solution. This gave a dark brown, clear solution with a pH of 7.1 and a solids content of 41.0%. The K value of a 1% strength aqueous solution of the copolymer (pH 7) was 12.2.

Example 4

A stirred 4 l glass reactor fitted with anchor stirrer, 2 automatic feed metering devices, reflux condenser and oil-bath heating was charged with 200.0 g of 6-methoxy-5,6-dihydro-4H-pyran and 1350 g of toluene, and these components were heated to 110° C. under inert gas. Feed stream 1, consisting of 200.0 g of methacrylic acid, was metered at a uniform rate over 2 hours into the resulting solution. Beginning at the same time as feed stream 1, feed stream 2, consisting of 4.0 g of 2,2'-azoisobutyronitrile and 250 g of toluene, was metered in at a uniform rate over the course of 3 hours. Subsequently, the reaction mixture was post-polymerized at 110° C. for 1.5 hours more. The suspended solid product was filtered off and washed with toluene. The pale yellowish powder was dried under reduced pressure, to give 234 g of the copolymer.

For conversion to an aqueous solution, 90.0 g of the copolymer were placed with 360 g of deionized water into a 2 l glass reactor fitted with steam inlet pipe and Liebig condenser, and were slowly heated to 10° C. Steam was passed through the mixture for 4 h. A pale brownish, cloudy solution with a pH of 3.0 and a solids content of 9.3% was obtained. The K value of a 1% strength aqueous solution of the copolymer adjusted to a pH of 7 using sodium hydroxide was 46.9.

Example 5

A stirred 2 l glass reactor fitted with anchor stirrer, 2 automatic feed metering devices, reflux condenser and oil-bath heating was charged with 40.0 g of 6-methoxy-5,6-dihydro-4H-pyran and 600 g of o-xylene, and these components were heated to 90° C. under inert gas. Feed stream 1, consisting of 160.0 g of methacrylic acid and 100 g of o-xylene, was metered at a uniform rate over 2 hours into the resulting solution. Beginning at the same time as feed stream 1, feed stream 2, consisting of 4.0 g of tert-butyl per-2-ethylhexanoate and 100 g of o-xylene, was metered in at a uniform rate over the course of 3 hours. Subsequently, the reaction mixture was post-polymerized at 90° C. for 1.5 hours more. After separating off the solvent in a rotary evaporator, 205.0 g of the copolymer were obtained in the form of a fine white powder.

For conversion to an aqueous solution, 175.0 g of the copolymer were placed with 525 g of deionized water into a 2 l glass reactor fitted with Liebig condenser, and were slowly heated to 100° C. Nitrogen was passed through the mixture for 30 minutes and residues of o-xylene were removed by distillation. The mixture was cooled to 50° C. and neutralized by slow addition of 120.0 g of 50% sodium hydroxide solution. A yellow, cloudy solution with a pH of 7.15 and a solids content of 25.0% was obtained. The K value of a 1% strength aqueous solution of the copolymer (pH 7) was 61.4.

Example 6

A stirred 2 l glass reactor fitted with anchor stirrer, 2 automatic feed metering devices, reflux condenser and oil-bath heating was charged with 26.1 g of 6-methoxy-5,6-dihydro-4H-pyran and 600 g of o-xylene, and these components were heated to 90° C. under inert gas. Feed stream 1, consisting of 173.9 g of methacrylic acid and 100 g of o-xylene, was metered at a uniform rate over 2 hours into the resulting solution. Beginning at the same time as feed stream 1, feed stream 2, consisting of 4.0 g of tert-butyl per-2-ethylhexanoate and 100 g of o-xylene, was metered in at a uniform rate over the course of 3 hours. Subsequently, the reaction mixture was post-polymerized at 90° C. for 1.5 hours more. After separating off the solvent in a rotary evaporator, 217.0 g of the copolymer were obtained in the form of a fine white powder.

For conversion to an aqueous solution, 195.0 g of the copolymer were placed with 550 g of deionized water into a 2 l glass reactor fitted with Liebig condenser, and were slowly heated to 100° C. Nitrogen was passed through the mixture for 40 minutes and residues of o-xylene were removed by distillation. The mixture was diluted with 200 g of deionized water, cooled to 50° C. and neutralized by slow addition of 135.0 g of 50% sodium hydroxide solution. A yellow, cloudy solution with a pH of 7.15 and a solids content of 24.4% was obtained. The K value of a 1% strength aqueous solution of the copolymer (pH 7) was 66.3.

Example 7

A stirred 2 l glass reactor fitted with anchor stirrer, 2 automatic feed metering devices, reflux condenser and oil-bath heating was charged with 40.0 g of 6-methoxy-5,6-dihydro-4H-pyran and 600 g of o-xylene, and these components were heated to 110° C. under inert gas. Feed stream 1, consisting of 160.0 g of methacrylic acid and 100 g of o-xylene, was metered at a uniform rate over 2 hours into the resulting solution. Beginning at the same time as feed stream 1, feed stream 2, consisting of 4.0 g of tert-butyl per-2-ethylhexanoate and 100 g of o-xylene, was metered in at a uniform rate over the course of 3 hours. Subsequently, the reaction mixture was post-polymerized at 110° C. for 1.5 hours more. After separating off the solvent in a rotary evaporator, 206.0 g of the copolymer were obtained in the form of a fine white powder.

For conversion to an aqueous solution, 170.0 g of the copolymer were placed with 510 g of deionized water into a 2 l glass reactor fitted with Liebig condenser, and were slowly heated to 100° C. Nitrogen was passed through the mixture for 45 minutes and residues of o-xylene were removed by distillation. The mixture was cooled to 50° C. and neutralized by slow addition of 115.0 g of 50% sodium hydroxide solution. A yellow, cloudy solution with a pH of 7.15 and a solids content of 27.2% was obtained. The K value of a 1% strength aqueous solution of the copolymer (pH 7) was 46.4.

Example 8

A stirred 4 l glass reactor fitted with anchor stirrer, 2 automatic feed metering devices, reflux condenser and oil-bath heating was charged with 147.0 g of maleic anhydride and 1178 g of toluene, and these components were heated to reflux under inert gas. Feed stream 1, consisting of 171.0 g of 6-methoxy-5,6-dihydro-4H-pyran, was metered at a uniform rate over 3 hours into the resulting solution. Beginning at the same time as feed stream 1, feed stream 2, consisting of 22.6 g of tert-butyl per-2-ethylhexanoate and 94 g of toluene, was metered in at a uniform rate over the course of 4 hours. Subsequently, the reaction mixture was post-polymerized at 110° C. for 2 hours more. After the end of polymerization, a brown suspension of low viscosity was obtained. At an internal temperature of 100° C., 318 g of deionized water and 38 g of 50% sodium hydroxide solution were added to the reaction mixture, and the solvent, toluene, was distilled off azeotropically by passing in steam. The solution was cooled and neutralized with 117.0 g of 50% sodium hydroxide solution. This gave a dark brown, slightly cloudy solution with a pH of 7.1 and a solids content of 34.3%. The K value of a 1% strength aqueous solution of the copolymer (pH 7) was 14.1.

Example 9

A stirred 2 l glass reactor fitted with anchor stirrer, 2 automatic feed metering devices, reflux condenser and oil-bath heating was charged with 147.3 g of maleic anhydride and 1179 g of toluene, and these components were heated to reflux under inert gas. Feed stream 1, consisting of a mixture of 137.1 g of 6-methoxy-5,6-dihydro-4H-pyran, and 33.7 g of 1-octene was metered at a uniform rate over 3 hours into the resulting solution. Beginning at the same time as feed stream 1, feed stream 2, consisting of 22.6 g of tert-butyl per-2-ethylhexanoate and 94 g of toluene, was metered in at a uniform rate over the course of 4 hours. Subsequently, the reaction mixture was post-polymerized at 110° C. for 2 hours more. After the end of polymerization, a yellow suspension of low viscosity was obtained. At an internal temperature of 100° C., 318 g of deionized water were added to the reaction mixture, and the solvent, toluene, was distilled off azeotropically by passing in steam. The solution was cooled and neutralized with 155.0 g of 50% sodium hydroxide solution. This gave a red-brown, clear solution with a pH of 7.1 and a solids content of 39.1%. The K value of a 1% strength aqueous solution of the copolymer (pH 7) was 13.8.

Example 10

A stirred 4 l glass reactor fitted with anchor stirrer, 3 automatic feed metering devices, reflux condenser and oil-bath heating was charged with 152.5 g of maleic anhydride and 1179 g of toluene, and these components were heated to reflux under inert gas. Feed stream 1, consisting of 129.0 g of 6-methoxy-5,6-dihydro-4H-pyran, was metered at a uniform rate over 3 hours into the resulting solution. Beginning at the same at feed stream 1, feed stream 2 consisting of 36.5 g of methacrylic acid was metered in at a uniform rate over the course of 3 hours. Likewise beginning at the same time as feed stream 1, feed stream 3, consisting of 22.6 g of tert-butyl per-2-ethylhexanoate and 94 g of toluene, was metered in at a uniform rate over the course of 4 hours. Subsequently, the reaction mixture was post-polymerized at 110° C. for 2 hours more. After the end of polymerization, a yellow suspension of low viscosity was obtained. At an internal temperature of 100° C., 318 g of deionized water were added to the reaction mixture, and the solvent, toluene, was distilled off azeotropically by passing in steam. The solution was cooled and neutralized with 182.0 g of 50% sodium hydroxide solution. This gave a red-brown, clear solution with a pH of 7.1 and a solids content of 40.3%. The K value of a 1% strength aqueous solution of the copolymer (pH 7) was 20.2.

Example 11

A stirred 4 l glass reactor fitted with anchor stirrer, 2 automatic feed metering devices, reflux condenser and oil-bath heating was charged with 147.0 g of maleic anhydride and 1178 g of toluene, and these components were heated to 95° C. under inert gas. Feed stream 1, consisting of 171.0 g of 6-methoxy-5,6-dihydro-4H-pyran, was metered at a uniform rate over 5 hours into the resulting solution. Beginning at the same time as feed stream 1, feed stream 2, consisting of 22.6 g of tert-butyl per-2-ethylhexanoate and 94 g of toluene, was metered in at a uniform rate over the course of 6 hours. Subsequently, the reaction mixture was post-polymerized at 95° C. for 2 hours more. After the end of polymerization, a yellow suspension of low viscosity was obtained. At an internal temperature of 85° C., 318 g of deionized water were added to the reaction mixture, and the solvent, toluene, was distilled off azeotropically by passing in steam. The solution was cooled and neutralized with 155.0 g of 50% sodium hydroxide solution. This gave a red-brown, clear solution with a pH of 7.1 and a solids content of 34.3%. The K value of a 1% strength aqueous solution of the copolymer (pH 7) was 14.5.

Example 12

A stirred 4 l glass reactor fitted with anchor stirrer, 2 automatic feed metering devices, reflux condenser and oil-bath heating was charged with 139.9 g of maleic anhydride and 1179 g of toluene, and these components were heated to reflux under inert gas. Feed stream 1, consisting of a mixture of 130.2 g of 6-methoxy-5,6-dihydro-4H-pyran and 48.0 of 1-dodecene was metered at a uniform rate over 3 hours into the resulting solution. Beginning at the same time as feed stream 1, feed stream 2, consisting of 22.6 g of tert-butyl per-2-ethylhexanoate and 94 g of toluene, was metered in at a uniform rate over the course of 4 hours. Subsequently, the reaction mixture was post-polymerized at 110° C. for 2 hours more. After the end of polymerization, a two-phase mixture consisting of an upper, clear, yellow phase and a lower, brown phase was obtained. At an internal temperature of 90° C., 318 g of deionized water were added to the reaction mixture, and the solvent, toluene, was distilled off azeotropically by passing in steam. The solution was cooled and neutralized with 148.0 g of 50% sodium hydroxide solution. This gave a red-brown, clear solution with a pH of 7.1 and a solids content of 33.1%. The K value of a 1% strength aqueous solution of the copolymer (pH 7) was 14.4.

Example 13

A stirred 4 l glass reactor fitted with anchor stirrer, 3 automatic feed metering devices, reflux condenser and oil-bath heating was charged with 27.2 g of maleic anhydride and 1179 g of cyclohexane, and these components were heated to 70° C. under inert gas. Feed stream 1, consisting of 240.8 g of 6-methoxy-5,6-dihydro-4H-pyran, and feed stream 2, consisting of 48.0 g of 1-dodecene, were metered at a uniform rate over 3 hours into the resulting mixture. Beginning at the same time as feed streams 1 and 2, feed stream 3, consisting of 3.2 g of tert-amyl perpivalate and 94 g of cyclohexane, was metered in at a uniform rate over the course of 4 hours. Subsequently, the reaction mixture was post-polymerized at 70° C. for 2 hours more. After the end of polymerization, the solvent was removed by distillation and then 318 g of deionized water were added to the reaction mixture and this mixture was heated to 100° C. The solution was cooled and adjusted to a pH of 7 using sodium hydroxide solution. This gave a brownish solution with a solids content of 42.1%. The K value of a 1% strength aqueous solution of the copolymer (pH 7) was 36.

Example 14

A stirred 4 l glass reactor fitted with anchor stirrer, 2 automatic feed metering devices, reflux condenser and oil-bath heating was charged with 25.2 g of maleic anhydride and 341 g of tetrahydrofuran, and these components were heated to reflux under inert gas. Feed stream 1, consisting of 294.7 g of 2,5-dimethoxy-2,5-dihydrofuran, was metered at a uniform rate over 3 hours into the resulting solution. Beginning at the same time as feed stream 1, feed stream 2, consisting of 6.4 g of 2,2'-azobis(2,4-dimethylvaleronitrile) and 50 g of tetrahydrofuran, was metered in at a uniform rate over the course of 4 hours. Subsequently, the reaction mixture was post-polymerized at 67° C. for 2 hours more. After the end of polymerization, the solvent was removed by distillation and then 318 g of deionized water were added to the reaction mixture and this mixture was heated to 100° C. and adjusted to a pH of 7 using sodium hydroxide solution. This gave a yellow-brown solution with a solids content of 43.1%. The K value of a 1% strength aqueous solution of the copolymer (pH 7) was 18.3.

Example 15

A stirred 4 l glass reactor fitted with anchor stirrer, 2 automatic feed metering devices, reflux condenser and oil-bath heating was charged with 138.0 g of maleic anhydride and 1179 g of toluene, and these components were heated to reflux under inert gas. Feed stream 1, consisting of 182.0 g of 2,5-dimethoxy-2,5-dihydrofuran, was metered at a uniform rate over 3 hours into the resulting solution. Beginning at the same time as feed stream 1, feed stream 2, consisting of 12.8 g of tert-butyl per-2-ethylhexanoate and 95 g of toluene, was metered in at a uniform rate over the course of 4 hours. Subsequently, the reaction mixture was post-polymerized at 110° C. for 2 hours more. After the end of polymerization, the internal temperature was reduced to 90° C. and then 320 g of deionized water were added to the reaction mixture. Then the solvent, toluene was distilled off azeotropically by passing in steam, and the solution was cooled and adjusted to a pH of 7 with sodium hydroxide solution. This gave a red-brown solution with a solids content of 40.8%. The K value of a 1% strength aqueous solution of the copolymer (pH 7) was 25.5.

Example 16

A stirred 4 l glass reactor fitted with anchor stirrer, 2 automatic feed metering devices, reflux condenser and oil-bath heating was charged with 144.9 g of maleic anhydride and 231 g of butanediol monomethyl ether, and these components were heated to 90° C. under inert gas. Feed stream 1, consisting of a mixture of 113.6 g of 6-methoxy-5,6-dihydro-4H-pyran and 61.5 g of styrene, was metered at a uniform rate over 3 hours into the resulting mixture. Beginning at the same time as feed stream 1, feed stream 2, consisting of 9.6 g of tert-butyl per-2-ethylhexanoate, was metered in at a uniform rate over the course of 4 hours. Subsequently, the reaction mixture was post-polymerized at 90° C. for 2 hours more. After the end of polymerization, the internal temperature was raised to 160° C. over 45 minutes and the water formed was removed by distillation. Deionized water and sodium hydroxide solution were added. This gave a neutral, aqueous solution with a solids content of 36.1%. The K value of a 1% strength aqueous solution of the copolymer (pH 7) was 29.2.

Example 17

A stirred 4 l glass reactor fitted with anchor stirrer, 3 automatic feed metering devices, reflux condenser and oil-bath heating was charged with 134.1 g of 6-methoxy-5,6-dihydro-4H-pyran, 650 g of deionized water and 3.2 g of sodium dihydrogen phosphate, and these components were heated to an internal temperature of 80° C. under inert gas. Feed stream 1, consisting of 141.2 g of sodium acrylate, and feed stream 2, consisting of 90 g of a 50% strength aqueous solution of acrylamide, were metered at a uniform rate over 3 hours into the resulting solution. Beginning at the same time as feed streams 1 and 2, feed stream 3, consisting of a solution of 3.2 g of 2,2'-azobis-2-methyl propionamidine dihydrochloride in 50 g of deionized water was metered in at a uniform rate over the course of 2 hours. Subsequently, the reaction mixture was post-polymerized at 80° C. for 2 hours more. After the end of polymerization, the internal temperature was reduced and the reaction mixture was adjusted to a pH of 7 with dilute sodium hydroxide solution. This gave a clear solution with a solids content of 25.8%. The K value of a 1% strength aqueous solution of the copolymer (pH 7) was 70.8.

Example 18

A stirred 4 l glass reactor fitted with anchor stirrer, 3 automatic feed metering devices, reflux condenser and oil-bath heating was charged with 133.8 g of maleic anhydride and 1179 g of toluene, and these components were heated to reflux under inert gas. Feed stream 1, consisting of 93.4 g of 6-methoxy-5,6-dihydro-4H-pyran, and feed stream 2, consisting of 92.8 g of dimethylaminopropylmethacrylamide, were metered at a uniform rate over 3 hours into the resulting solution. Beginning at the same time as feed stream 1, feed stream 3, consisting of 22.6 g of tert-butyl per-2-ethylhexanoate and 95 g of toluene, was metered in at a uniform rate over the course of 4 hours. Subsequently, the reaction mixture was post-polymerized at 110° C. for 2 hours more. After the end of polymerization the internal temperature was reduced to 90° C. and then 320 g of deionized water were added to the reaction mixture. Then the solvent, toluene was distilled off azeotropically by passing in steam, and the solution was cooled and adjusted to a pH of 7.1 with sodium hydroxide solution. This gave a red-brown solution with a solids content of 40.8%. The K value of a 1% strength aqueous solution of the copolymer (pH 7) was 31.5.

Example 19

A stirred 4 l glass reactor fitted with anchor stirrer, 2 automatic feed metering devices, reflux condenser and oil-bath heating was charged with 147.0 g of maleic anhydride and 1178 g of toluene, and these components were heated to 111° C. under inert gas. Feed stream 1, consisting of 171.0 g of 6-methoxy-5,6-dihydro-4H-pyran, was metered at a uniform rate over 2 hours into the resulting solution. Beginning at the same time as feed stream 1, feed stream 2, consisting of 22.6 g of tert-butyl per-2-ethylhexanoate and 95 g of toluene, was metered in at a uniform rate over the course of 4 hours. Subsequently, the reaction mixture was post-polymerized at 110° C. for 2 hours more. 209.0 g of tridecylamine were added to the resulting pale brown suspension of low viscosity, and the reaction mixture was heated at 160° C. for 45 minutes; subsequently, 200 g of deionized water were added to the reaction mixture and the organic solvent was distilled off azeotropically by passing in steam. At the end of steam distillation a brown dispersion was present, which was cooled and adjusted to a pH of 7 with dilute sodium hydroxide solution. This gave a brown dispersion with a solids content of 26.3%. The K value of a 1% strength aqueous solution of the copolymer (pH 7) was 19.9.

Example 20

A stirred 4 l glass reactor fitted with anchor stirrer, 2 automatic feed metering devices, reflux condenser and oil-bath heating was charged with 147.0 g of maleic anhydride, 400 g of toluene and 3.2 g of a maleic anhydride and diisobutene copolymer, 60% of whose anhydride groups have been esterified with n-decanol and these components were heated to 111° C. under inert gas. Feed stream 1, consisting of 171.0 g of 6-methoxy-5,6-dihydro-4H-pyran, was metered at a uniform rate over 3 hours into the resulting solution. Beginning at the same time as feed stream 1, feed stream 2, consisting of 22.6 g of tert-butyl per-2-ethylhexanoate and 80 g of toluene, was metered in at a uniform rate over the course of 4 hours. Subsequently, the reaction mixture was post-polymerized at 110° C. for 2 hours more. After the end of polymerization, a pale brown suspension of low viscosity was obtained. 200 g of deionized water was added to the reaction mixture, and the organic solvent was distilled off azeotropically by passing in steam. At the end of steam distillation a brown solution was present, which was cooled and neutralized with 158.0 g of 50% sodium hydroxide solution. This gave a dark brown, clear solution with a pH of 7.3 and a solids content of 34.4%. The K value of a 1% strength aqueous solution of the copolymer (pH 7) was 16.2.

Example 21

A stirred 4 l glass reactor fitted with anchor stirrer, 2 automatic feed metering devices, reflux condenser and oil-bath heating was charged with 147.0 g of maleic anhydride, 400 g of toluene and 3.2 g of polyoctadecyl vinyl ether and these components were heated to 110° C. under inert gas. Feed stream 1, consisting of 171.0 g of 6-methoxy-5,6-dihydro-4H-pyran, was metered at a uniform rate over 3 hours into the resulting solution. Beginning at the same time as feed stream 1, feed stream 2, consisting of 22.6 g of tert-butyl per-2-ethylhexanoate and 80 g of toluene, was metered in at a uniform rate over the course of 4 hours. Subsequently, the reaction mixture was post-polymerized at 110° C. for 2 hours more. After the end of polymerization, a pale brown suspension of low viscosity was obtained. 200 g of deionized water was added to the reaction mixture, and the organic solvent was distilled off azeotropically by passing in steam. At the end of steam distillation a slightly cloudy brown solution was present, which was cooled and neutralized with 158.0 g of 50% sodium hydroxide solution. This gave a dark brown, clear solution with a pH of 7.1 and a solids content of 32.7%. The K value of a 1% strength aqueous solution of the copolymer (pH 7) was 13.9.

Example 22

A stirred 4 l glass reactor fitted with anchor stirrer, 2 automatic feed metering devices, reflux condenser and oil-bath heating was charged with 147.0 g of maleic anhydride, 400 g of toluene and 3.2 g of a maleic anhydride and styrene copolymer having a number-average molecular weight of 110,000 and these components were heated to 111° C. under inert gas. Feed stream 1, consisting of 171.0 g of 6-methoxy-5,6-dihydro-4H-pyran and 16.0 g of n-dodecylmercaptan, was metered at a uniform rate over 3 hours into the resulting solution. Beginning at the same time as feed stream 1, feed stream 2, consisting of 22.6 g of tert-butyl per-2-ethylhexanoate and 80 g of toluene, was metered in at a uniform rate over the course of 4 hours. Subsequently, the reaction mixture was post-polymerized at 110° C. for 2 hours more. After the end of polymerization, a pale brown suspension of low viscosity was obtained. 200 g of deionized water was added to the reaction mixture, and the organic solvent was distilled off azeotropically by passing in steam. At the end of steam distillation a brown solution was present, which was cooled and neutralized with 155.0 g of 50% sodium hydroxide solution. This gave a dark brown, clear solution with a pH of 7.1 and a solids content of 36.6%. The K value of a 1% strength aqueous solution of the copolymer (pH 7) was 11.2.

Application in Leather Production

Example 23
Self-Tanning

Pickled cattle pelt having a split thickness of 3 mm was treated with 4%, based on solids content, of a copolymer prepared as in Example 2, the pelt being in 50% water and 50% pickling liquor at 20° C. and at a pH of 3.0. The milling time was 180 minutes. The liquor was then heated to 40° C., 0.8 % of commercially available magnesium oxide was added, and the mixture was milled at this temperature for 180 minutes. It was then cooled to room temperature and agitated overnight in the milling drum. The pH was subsequently 4.0, and the mixture was heated to 40° C. and adjusted to a pH of 6.8 by portionwise addition of sodium bicarbonate over 5 hours. The leather was rinsed with water and racked overnight. The shrinkage temperature was 81° C., as against 68° C. for the untreated pelt.

Example 24
Retanning of Chrome-Tanned Leather to Give Upholstery Leather

A cattle wet blue with a shaved thickness of 1.2 mm was first of all washed with 300% of water at 30° C. and was then deacidified in 100% liquor at 30° C. with sodium formate and sodium bicarbonate to a pH of about 5.0. After brief rinse, the leather was drum-retanned at 40° C. in 100% liquor using 3%, based on the solid product, of the polymer prepared in Example 1. After milling for 90 minutes, the leather was rinsed again and dyed in 100% liquor at 50° C. using 1% of a commercially available metal complex leather dye, fatliquored with 8% of a commercially available fatliquor, and adjusted to a pH of 4.0 using formic acid. The leather was racked overnight, then wet-stretched and dried. Sawdusting, staking and drumming gave a soft leather with very good body, intense, level coloration and good through-coloring in section. The mill grain showed a fine, uniform appearance, even at the flanks and sides.

Examples 25 and 26

Working in a manner similar to that of Example 24, 3%, based on the solids content of the products, of each of the copolymers from Examples 3 and 4 were used for retanning chrome cattle leather to give upholstery leather. In both cases, a very full-bodied and soft leather was obtained which was notable in particular for a good intense color with good through-coloration and a uniform mill grain.

Comparative Example A
Retanning of Chrome-Tanned Leather to Give Upholstery Leather A commercially available polymer based on methacrylic acid was used by the method similar to that of Example 24 to retan chrome cattle leather to give upholstery leather. The resultant leather was lower in body and had a paler color for the same amount of dye, both on the surface and in section.

Example 27
Retanning of Chrome-Tanned Leather to Give Shoe Uppers Leather at High Polymer Concentration A cattle wet blue with a shaved thickness of 1.5 mm was, in a conventional manner, rinsed, washed and subsequently deacidified to a pH of 4.5 in 100% liquor using sodium formate at 30° C. After washing, the leather was milled for 90 minutes at 40° C. in 100% liquor containing 5%, based on the solids content, of the copolymer from Example 1. The leather was then washed again and dyed in 100% liquor at 50° C. for 20 minutes using 1% of a commercially available leather dye. Fat liquoring took place in the same liquor using 4% of a commercially available fat liquor. The pH was then adjusted to 3.6 using formic acid. After a brief rinse, the leather was stretched, dried, treated with sawdust and staked, giving a leather of good body and with a firm grain, having a rounded, supple handle and a very level and intense coloration.

Examples 28 to 48
Retanning of Chrome-Tanned Leather to Give Shoe Uppers Leather at High Polymer Concentration Working in the same way as in Example 27, 5%, based on solids content, of each of the copolymers from Examples 2 to 22 were used as retanning agent. In every case they gave very full-bodied and intensely colored leathers whose softness varied depending on the comonomer. In comparison to the above examples, commercial polymers based on acrylic acid, when processed in the same way, led to severely hardened, rough leathers with an unpleasant handle.

Example 49
Retanning of Chrome-Tanned Leather to Give Shoe Uppers Leather at Low Concentration of Polymer Tanning Agent A cattle wet blue with a shaved thickness of 1.8 mm was, in the conventional manner, rinsed, washed and then deacidified to a pH of 4.4 in 100% liquor using sodium formate. After rewashing, it was then first of all milled for 30 minutes in 100% liquor at 30° C. using 1.0% of a commercially available dispersant (phenolsulfonic acid-formaldehyde condensation product). It was then retanned in the same liquor at 30° C. using 1%, based on solids content, of the copolymer from Example 1. After milling for 90 minutes, the leather was rinsed again. Dyeing was carried out in 200% liquor at 40° C. using 1% of a commercially available leather dye, and fat liquoring was carried out using 4% of a commercially available fat liquor. The pH was then adjusted to 3.6 with formic acid. After a brief rinse the leather was stretched, dried, treated with sawdust and staked. The resultant leather was of good body and softness, had a very good firm grain and showed very good dyeing behavior, in terms of both surface dyeing and penetration of the dye into the cross-section of the leather.

Comparative Example B

Example 24 was repeated using, instead of the product from Example 8, a commercially available tanning agent based on acrylic acid. In this case the body, softness and dyed appearance of the leather were much poorer than in Example 24.

We claim:

1. A method of self-tanning, pre-tanning or assist tanning leather pelts or skin pelts or of retanning leather or skins, which comprises using, as a tanning agent, an aqueous solution or dispersion of copolymers composed of
A) from 5 to 95 mol % of ethylenically unsaturated mono- or dicarboxylic acids having 3 to 10 carbons, their anhydrides, their alkali metal, alkaline earth metal or ammonium salts, or mixtures thereof,
B) from 5 to 95 mol % of ethylenically unsaturated acetals, ketals or orthocarboxylic esters of the formula I

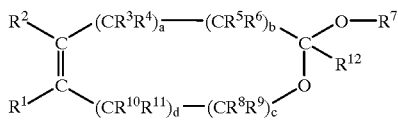

wherein
$R^1$ and $R^2$ independently are hydrogen, $C_1$–$C_{10}$-alkyl, $C_1$–$C_{10}$-alkoxy, amino, $C_1$–$C_4$-alkylamino or di-$C_1$–$C_4$-alkylamino,
$R^3$, $R^4$, $R^5$, $R^6$, $R^8$, $R^9$, $R^{10}$ and $R^{11}$ independently are hydrogen $C_1$–$C_{10}$-alkoxy, amino, $C_1$–$C_4$-alkylamino, di-$C_1$–$C_4$-alkylamino, $C_6$–$C_{14}$-aryl, $C_7$–$C_{18}$-aralkyl, carboxyl, $C_1$–$C_{20}$-alkoxycarbonyl, $C_2$–$C_{18}$-alkyl interrupted by 1–5 nonadjacent oxygens, or are sulfo or phosphono,
$R^7$ is hydrogen, $C_1$–$C_{10}$-alkyl, $C_6$–$C_{14}$-aryl, $C_7$–$C_{18}$-aralkyl or $C_1$–$C_{10}$-acyl,
$R^{12}$ is hydrogen, $C_1$–$C_{10}$-alkyl, $C_1$–$C_{10}$-alkoxy, hydroxyl or $C_1$–$C_{10}$-acyloxy, and
a, b, c and independently are 0 or 1, it also being possible for $R^2$ and $R^4$ together to form a 1,3- or 1,4-alkylene group of 3 to 12 carbons and for
$R^5$ and $R^7$ together to form a 1,2- or 1,3-alkylene group of 2 to 12 carbons, and
C) from 0 to 70 mol % of other copolymerizable monomers, or their hydrolysis products or polymer-analogous reaction products.

2. A method as claimed in claim 1, wherein the monomers A included in the copolymers are acrylic acid, methacrylic acid, maleic acid, itaconic acid or maleic anhydride.

3. A method as claimed in claim 1, wherein the monomers B included in the copolymers are 5,6-dihydro-4H-pyrans of the formula Ia

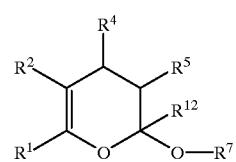

or 2,5-dihydrofurans of the formula Ib

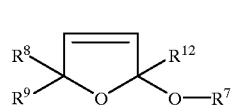

wherein
$R^1$, $R^2$, $R^4$, $R^5$, $R^7$, $R^8$, $R^9$ and $R^{12}$ are as defined above.

4. A method as claimed in claim 1, wherein the monomers B included in the copolymers are 6-methoxy-5,6-dihydro-4H-pyran or 2,5-dimethoxy-2,5-dihydrofuran.

5. A method as claimed in claim 1, wherein the monomers C included in the copolymers are methyl (meth)acrylate, ethyl (meth)acrylate, lauryl (meth)acrylate, butene, isobutene, 2,4,4-trimethyl-1-pentene, 1-octene, $C_8$–$C_{10}$ olefin, 1-dodecene, $C_{12}$–$C_{14}$ olefin, $C_{20}$–$C_{24}$ olefin, oligopropene, oligohexene, oligooctadecene, reactive polyisobutene, vinyl stearate, 2-acrylamido-2-methylpropanesulfonic acid, ethylhexyl vinyl ether, styrene, acrolein or acrylonitrile.

* * * * *